(12) United States Patent
Takeyama et al.

(10) Patent No.: US 8,405,260 B2
(45) Date of Patent: Mar. 26, 2013

(54) ELECTRIC POWER TOOL

(75) Inventors: Atsushi Takeyama, Yasu (JP); Hidenori Shimizu, Hikone (JP)

(73) Assignee: Panasonic Electric Works Power Tools Co., Ltd., Shiga (JP)

( * ) Notice: Subject to any disclaimer, the term of this patent is extended or adjusted under 35 U.S.C. 154(b) by 208 days.

(21) Appl. No.: 12/923,354

(22) Filed: Sep. 16, 2010

(65) Prior Publication Data
US 2011/0068642 A1 Mar. 24, 2011

(30) Foreign Application Priority Data
Sep. 18, 2009 (JP) ................................ 2009-217831

(51) Int. Cl.
*H02K 7/14* (2006.01)
(52) U.S. Cl. ................. 310/50; 310/64; 310/65; 310/71
(58) Field of Classification Search ..................... 310/50, 310/64, 65, 71
See application file for complete search history.

(56) References Cited

U.S. PATENT DOCUMENTS

| | | | |
|---|---|---|---|
| 3,871,069 A | | 3/1975 | Grieb |
| 7,462,965 B2* | | 12/2008 | Natsuhara et al. ............ 310/64 |
| 2002/0182020 A1 | | 12/2002 | Oomori et al. |
| 2005/0121209 A1* | | 6/2005 | Shimizu et al. ............ 173/217 |
| 2005/0263303 A1* | | 12/2005 | Shimizu et al. .................. 173/2 |
| 2005/0263305 A1* | | 12/2005 | Shimizu et al. .................. 173/2 |
| 2006/0255756 A1 | | 11/2006 | Iwata et al. |
| 2006/0261689 A1* | | 11/2006 | Natsuhara et al. ............ 310/64 |
| 2007/0273221 A1* | | 11/2007 | Kinoshita et al. ............ 310/58 |

FOREIGN PATENT DOCUMENTS

| | | |
|---|---|---|
| CN | 1778029 | 5/2006 |
| CN | 1945936 A | 4/2007 |
| DE | 102 09 097 | 9/2002 |
| DE | 10 2007 043 916 | 4/2009 |
| EP | 1 621 293 | 2/2006 |
| EP | 1 715 565 | 10/2006 |
| JP | H11-300656 | 11/1999 |
| JP | 2007-268634 | 10/2007 |
| JP | 2009-72880 | 4/2009 |
| WO | 2007/119596 | 10/2007 |

OTHER PUBLICATIONS

The extended European search report dated Jun. 14, 2011.
Office Action issued on Dec. 6, 2012, in corresponding Chinese application No. 2010 10283371.7.

* cited by examiner

*Primary Examiner* — Tran Nguyen
*Assistant Examiner* — Alex W Mok
(74) *Attorney, Agent, or Firm* — Bacon & Thomas, PLLC

(57) ABSTRACT

An electric power tool includes a motor, a speed reduction mechanism, a power output unit, a control circuit unit, and a housing. The housing provided with an air supply-exhaust hole. The motor includes a stator core wound with coils, a rotor core and an electronic circuit unit. The electronic circuit unit includes a circuit board, electronic components arranged in the circuit board and including a switching element, coil connection portions arranged in the circuit board and connected to the coils and a control circuit connection portion arranged in the circuit board and connected to the control circuit unit. The motor further includes a radiator member for dissipating heat generated in the switching element of the electronic circuit unit and an insulating cover member molded to cover the electronic components, the coil connection portions, the control circuit connection portion, the circuit board and the radiator member.

6 Claims, 4 Drawing Sheets

ELECTRIC POWER TOOL

FIELD OF THE INVENTION

The present invention relates to an electric power tool using a brushless motor.

BACKGROUND OF THE INVENTION

In an electric power tool using a brushless motor, there is a need to employ a structure for effectively cooling a motor and a switching element, both of which tend to become hot during operation. Japanese Patent Application Publication No. 2009-72880 discloses a brushless motor in which a radiator member is in contact with a switching element to dissipate the heat generated from the switching element.

In the conventional brushless motor, however, electronic components, such as a switching element and the like, and connection portions thereof are arranged on a circuit board in an exposed state. If the brushless motor is employed in an electric power tool, iron particles or water droplets present in the air may adhere to the exposed components or portions, eventually causing short circuit. In case where an air supply-exhaust hole is formed in a housing near the motor in an effort to introduce the air therethrough, enhanced air cooling performance is not compatible with reliable prevention of short circuit caused by the air introduced. In other words, an increase in amount of air introduced through the air supply-exhaust hole may results in an increased possibility of short circuit caused by iron particles or water droplets present in the air introduced.

SUMMARY OF THE INVENTION

In view of the above, the present invention provides an electric power tool capable of efficiently cooling a motor and a switching element with the air introduced through an air supply-exhaust hole formed in a housing near the motor without causing short circuit due to iron particles or water droplets present in the air introduced through the air supply-exhaust hole in a cost-effective manner.

In accordance with an embodiment of the invention, there is provided an electric power tool including: a motor; a speed reduction mechanism for transferring the power of the motor; a power output unit driven by the power transferred through the speed reduction mechanism; a control circuit unit for controlling rotation of the motor; and a housing for accommodating the motor, the speed reduction mechanism, the power output unit and the control circuit unit, the housing provided with an air supply-exhaust hole opened near the motor In the electric power tool, the motor may be a brushless motor including a stator core wound with coils, a rotor core provided with a magnet and an electronic circuit unit connected to the coils and the control circuit unit. The electronic circuit unit includes a circuit board, electronic components arranged in the circuit board and including a switching element for turning on or off the electric power supplied to the coils, coil connection portions arranged in the circuit board and connected to the coils and a control circuit connection portion arranged in the circuit board and connected to the control circuit unit. The motor further includes a radiator member for dissipating heat generated in the switching element of the electronic circuit unit and an insulating cover member molded to cover the electronic components, the coil connection portions, the control circuit connection portion, the circuit board and the radiator member.

With such configuration, the radiator member for cooling the heated switching element is arranged in position, and then the electrically conductive parts of the electronic circuit unit are covered with the insulating cover member, whereby the radiator member and the electronic circuit unit can be unified by the insulating cover member. This prevents occurrence of short circuit in the electronic circuit unit, which would otherwise be caused by iron particles or water droplets present in the air introduced through the air supply-exhaust hole of the housing. Thanks to this feature, it is possible to form the air supply-exhaust hole having an increased size near the motor and to supply a large quantity of cooling air to the motor, thereby efficiently dissipating heat from the radiator member and the motor by use of the cooling air. Since the insulating cover member is unified with the radiator member and the electronic circuit unit through a molding process, it is possible to reduce the time and cost required in the manufacturing process. In addition, it is possible to efficiently radiate the heat of the insulating cover member through the radiator member.

The insulating cover member may preferably be molded in such a way as to partially expose the radiator member. This makes it possible to supply the exposed portion of the radiator member with the cooling air introduced through the air supply-exhaust hole near the motor, thereby dissipating heat from the radiator member.

The radiator member may preferably include an exposure surface and a rib provided along the periphery of the exposure surface. Formation of the rib helps increase the overall surface area of the radiator member and makes it easy to reliably form the exposed portion, eventually further improving the heat radiation efficiency for the radiator member.

Preferably, an opening may be formed to extend through the circuit board of the electronic circuit unit, the radiator member and the insulating cover member, and a rotor shaft of the rotor core may be extended through the opening. This makes it possible to feed the cooling air introduced through the air supply-exhaust hole to the interior of the motor, thereby further efficiently dissipating heat from the motor.

The insulating cover member may include a ventilation window formed between one end surface thereof and the stator core. This makes it possible to feed the cooling air introduced through the air supply-exhaust hole to the interior of the motor through the ventilation window, thereby even further efficiently dissipating heat from the motor.

In accordance with the present invention, it is possible to cost-effectively provide an electric power tool capable of efficiently cooling the motor and the switching element with the air introduced through the air supply-exhaust hole formed in the housing near the motor without causing short circuit due to iron particles or water droplets present in the air introduced through the air supply-exhaust hole in a cost-effective manner.

Further, it is possible to efficiently dissipate heat from the radiator member by molding the insulating cover member in such a way as to partially expose the radiator member.

Moreover, it is possible to improve the heat radiation efficiency for the radiator member by forming the rib arranged along the periphery of the exposure surface.

In addition, it is possible to further efficiently dissipate heat through the opening and to further improve the heat radiation efficiency by forming the opening for insertion of the rotor shaft such that it is extended through the circuit board, the radiator member and the insulating cover member.

Furthermore, it is possible to further efficiently dissipate heat through the ventilation window and to further improve the heat radiation efficiency by forming the ventilation window between one end surface of the insulating cover member and the stator core.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

Figure 1:
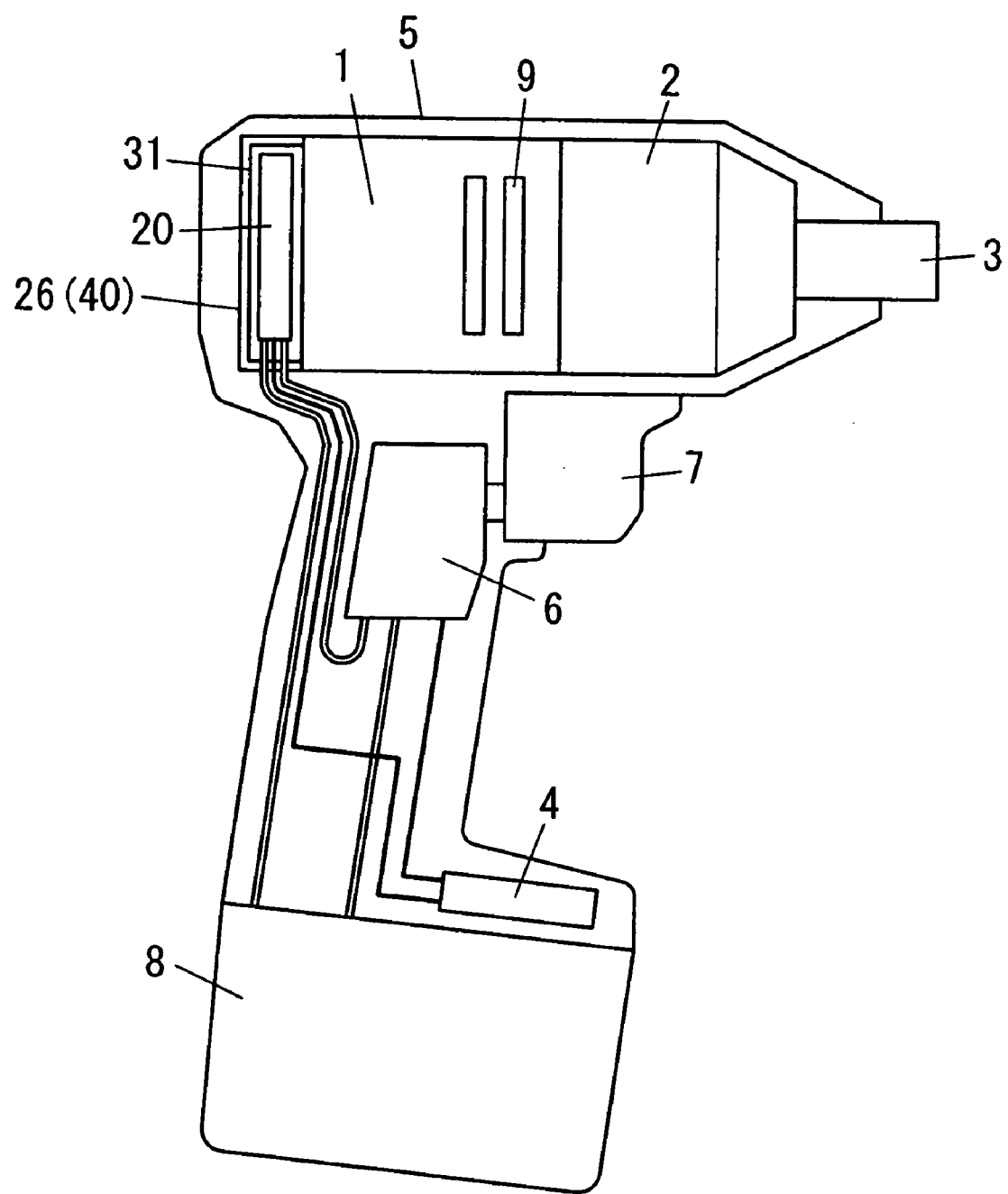
FIG. 1 is a schematic overall view showing an electric power tool in accordance with one embodiment of the present invention.

Embodiments of the present invention will now be described with reference to the accompanying drawings which form a part hereof. FIG. 1 schematically shows the overall configuration of an electric power tool in accordance with one embodiment of the present invention.

The electric power tool is a portable electric rotary tool and includes a housing 5, a motor 1 serving as a drive power source, a speed reduction mechanism 2 for transferring the power of the motor 1 and a power output unit 3 driven by the power transferred through the speed reduction mechanism 2. The motor 1, the speed reduction mechanism 2 and the power output unit 3 are connected in series within the housing 5. The housing 5 is provided with an air supply-exhaust hole 9 opened near the motor 1. In the subject specification, the side to which the power is transferred (namely, the side at which the speed reduction mechanism 2 is positioned with respect to the motor 1) will be referred to as "front side" and the opposite side (namely, the side at which the motor 1 is positioned with respect to the speed reduction mechanism 2) will be referred to as "rear side".

Within the housing 5, there are also accommodated a switch block 6 and a control circuit unit 4 for performing the rotation control of the motor 1. The switch block 6 is connected to a trigger switch 7 retractably provided in the housing 5. The control circuit unit 4 controls the motor 1 to rotate at a rotation speed corresponding to the retraction amount of the trigger switch 7. A battery pack 8 is mounted to the housing 5 to supply electric power to the motor 1.

Figure 2:
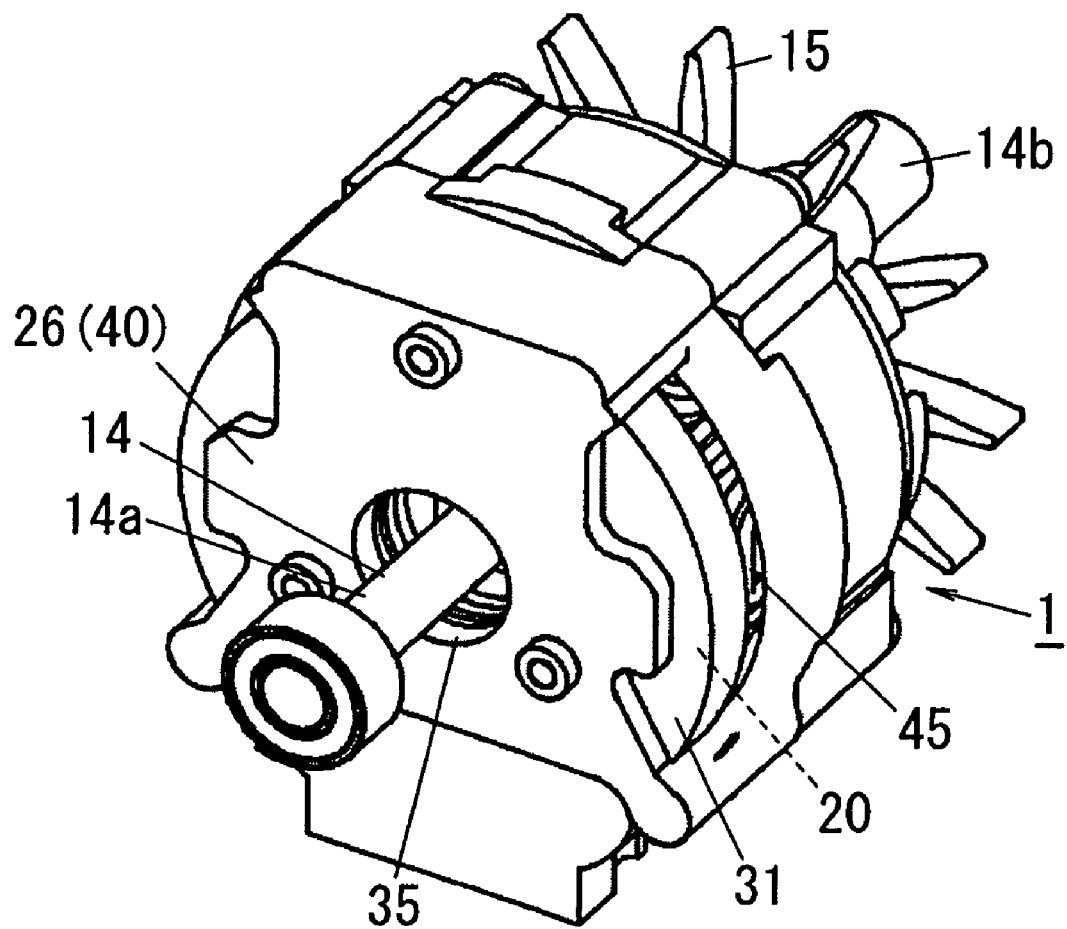
FIG. 2 is a perspective view showing a motor accommodated within the electric power tool.
Figure 3:
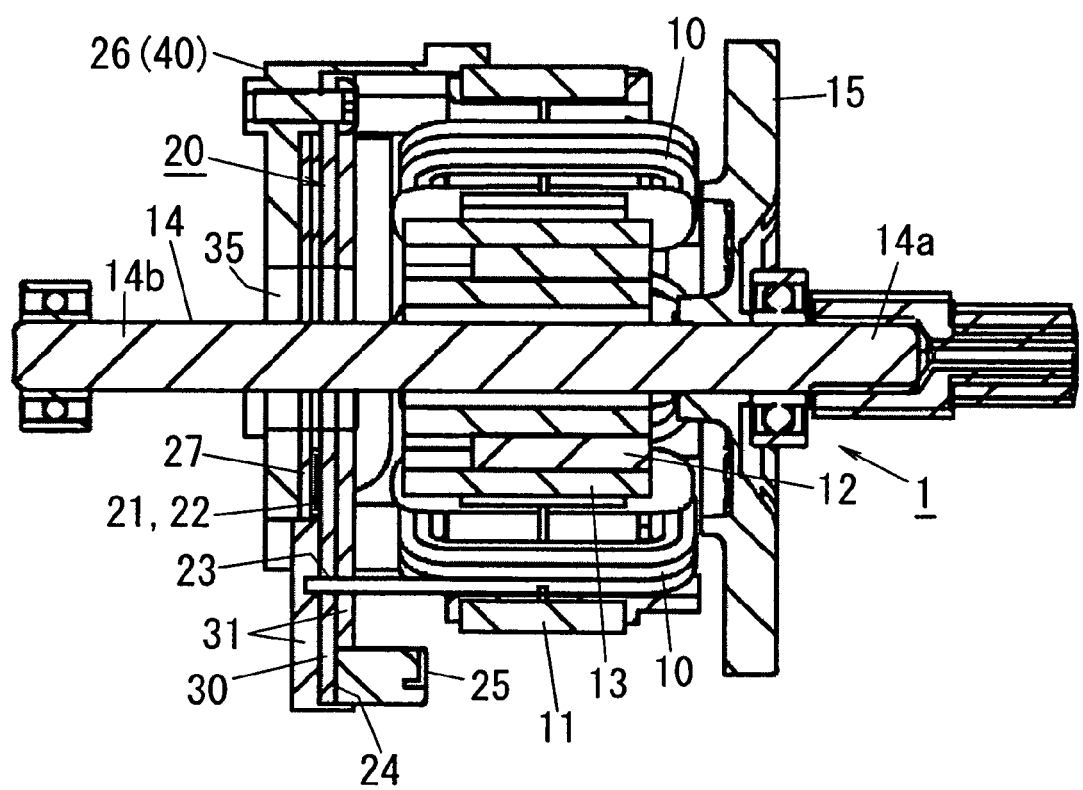
FIG. 3 is a section view of the motor shown in FIG. 2.

FIGS. 2 and 3 show the motor 1 in more detail. The motor 1 is a brushless motor and includes a stator core 11 having coils 10 wound inside thereof and a rotor core 13 having a magnet 12 arranged therein. The rotor core 13 is covered with the stator core 11. A rotor shaft 14 is securely fitted to the center portion of the rotor core 13. The rotor shaft 14 largely protrudes away from the stator core 11 in the front-rear direction thereof (namely, to the axial opposite sides thereof) and includes a front protrusion portion 14a to which a cooling fan 15 is mounted as a unit.

In the motor 1, an electronic circuit unit 20 for use in a brushless motor is provided on the rear side of the stator core 11. The electronic circuit unit 20 makes up an electronic circuit connected to the coils 10 and the control circuit unit 4. The electronic circuit unit 20 includes a circuit board 30 arranged perpendicularly to the rotor shaft 14, electronic components 22 including a switching element 21 for turning on and off the electric power supplied to the coils 10, coil connection portions 23 electrically connected to the coils 10 and a control circuit connection portion 24 electrically connected to the control circuit unit 4. The electronic components 22, the coil connection portions 23 and the control circuit connection portion 24 are arranged on the circuit board 30. A connector 25 is connected to the control circuit connection portion 24.

In the motor 1, a radiator body 26 is screw-fixed to the rear side of the stator core 11. The radiator body 26 is a radiator member 40 for efficiently dissipating the heat generated from the switching element 21. The radiator body 26 makes contact with the switching element 21 through a heat conduction sheet 27 shown in FIG. 3. The electronic components 22 (including the switching element 21), the coil connection portions 23, the control circuit connection portion 24, the circuit board 30 and the radiator body 26, which are included in the electronic circuit unit 20, are covered and unified by an insulating cover member 31 molded with an insulating material such as a resin or the like. The radiator body 26 is arranged such that the outer surface thereof is exposed to the outside.

More specifically, the end portions of the coils 10 are connected to the coil connection portions 23 of the circuit board 30 from the front side. The coil connection portions 23 are covered by the molded insulating cover member 31. One end of the connector 25 is connected to the control circuit connection portion 24 arranged on the front surface of the circuit board 30. The control circuit connection portion 24 is covered by the insulating cover member 31 while the other end of the connector 25 is exposed to the front side.

The electronic components 22 (including the switching element 21) arranged on the circuit board 30 are also covered with the molded insulating cover member 31 against exposure. In the illustrated embodiment, the insulating cover member 31 is molded in such a state that the switching element 21 is arranged on the rear surface of the circuit board 30 while the radiator body 26 is opposed to the rear side of the switching element 21 through the heat conduction sheet 27. The radiator body 26 is opened to the front side and is arranged such that the rear and side surfaces thereof are exposed to the outside.

A circular opening 35 is formed to straightly extend through the circuit board 30 of the electronic circuit unit 20, the radiator body 26 arranged at the rear side of the electronic circuit unit 20 and the insulating cover member 31 unified with the electronic circuit unit 20 and the radiator body 26. The rear protrusion portion 14b of the rotor shaft 14 is inserted into the opening 35 with a specified space left therebetween. The rear protrusion portion 14b of the rotor shaft 14 protrudes rearwards beyond the opening 35.

The insulating cover member 31 is molded as follows. The radiator body 26 and the electronic circuit unit 20 are first fixed to the stator core 11, and arranged in a box mold (not shown) with an open top surface such that the radiator body 26 is in contact with the inner bottom surface of the box mold. Then, an insulating material is poured into the box mold and is allowed to cure. Examples of the insulating material include two-liquid urethane cured resin. It may be possible to use a silicon-based resin or a thermosetting resin.

In order to form the opening 35 in the molding process, a protrusion corresponding in shape to the opening 35 is provided at the central portion of the inner bottom surface of the box mold. The protrusion prevents infiltration of the insulating material, thereby forming the opening 35. After the insulating material is cured, the molded product is taken out from the box mold, thus producing the motor 1 integrally molded with the insulating cover member 31. Preferably, the box mold has a release gradient for easier removal of the molded product.

The insulating cover member 31 is formed to have a ventilation window 45 provided near the stator core 11 (see FIG. 2). The ventilation window 45 is an opening through which the stator core 11 is exposed to the lateral sides.

In the electric power tool of the present embodiment configured as above, the radiator body 26 for cooling the heated switching element 21 is preliminarily arranged in position. Then, the electrically conductive parts (namely, the electronic components 22 including the switching element 21, the coil connection portions 23, the control circuit connection portion 24 and the circuit board 30) of the electronic circuit unit 20 for a brushless motor are all covered with the insulating cover member 31 made of an insulating material, whereby the radiator body 26 and the electronic circuit unit 20 are unified by the insulating cover member 31. This prevents occurrence of short circuit in the electronic circuit unit 20, which would otherwise be caused by iron particles or water droplets present in the air introduced through the air supply-exhaust hole 9 of the housing 5. Thanks to this feature, it is possible to form the air supply-exhaust hole 9 having an increased size near the motor 1 and to supply a large quantity of cooling air to the motor 1 with no trouble, thereby efficiently dissipating heat from the exposed portion of the radiator body 26 and the motor 1.

Since the insulating cover member 31 is unified with the radiator body 26 and the electronic circuit unit 20 through a molding process, it is possible to reduce the time and cost required in the manufacturing process. In addition, it is possible to efficiently radiate the heat of the insulating cover member 31 through the radiator body 26.

Inasmuch as the opening 35 is formed to continuously extend through the circuit board 30 of the electronic circuit unit 20, the radiator body 26 arranged at the rear side of the circuit board 30 and the insulating cover member 31 unified with the circuit board 30 and the radiator body 26, it is possible to supply a cooling air to the interior of the motor 1, thereby efficiently dissipating heat from the entire portions of the motor 1.

Next, description will be made on an electric power tool in accordance with another embodiment of the present invention. The same configurations as those of the preceding embodiment will be omitted from description. Only the differing points will be described in detail.

Figure 4:
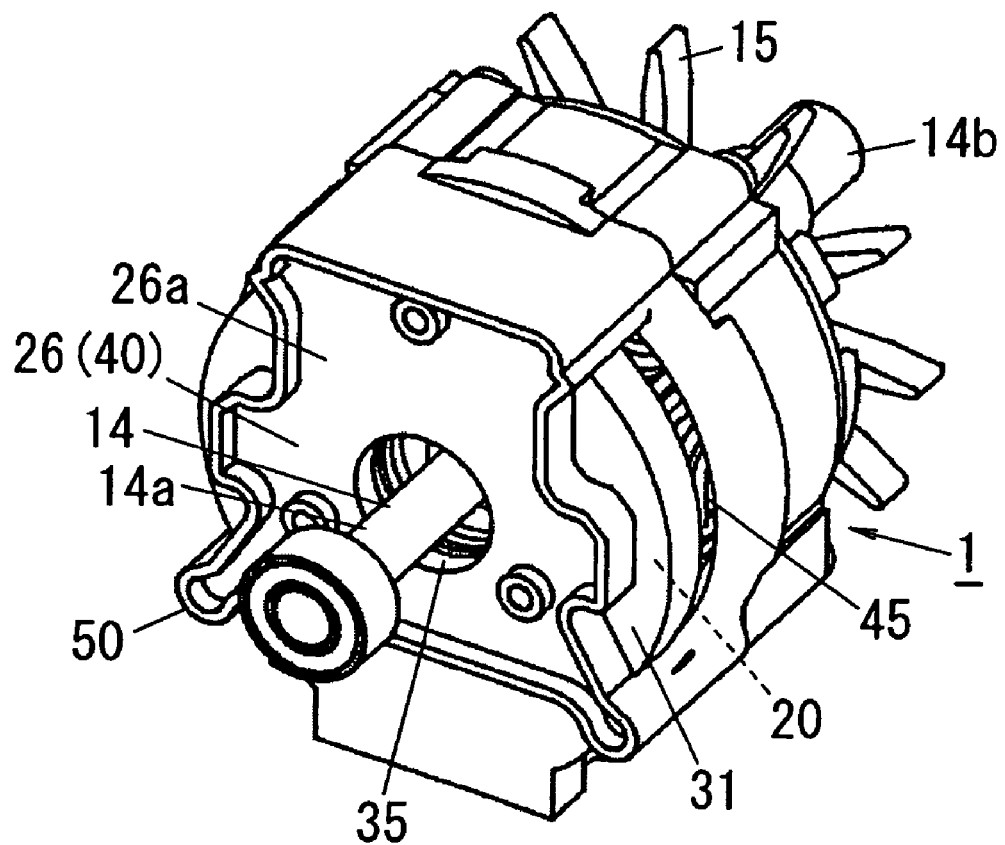
FIG. 4 is a perspective view showing a motor accommodated within an electric power tool in accordance with another embodiment of the present invention.

FIG. 4 shows a motor 1 accommodated within an electric power tool according to another embodiment. In the motor 1, the radiator body 26 (namely, the radiator member 40 for radiating heat from the switching element 21) includes a planar exposure surface 26a formed at the rear end thereof and a protruding rib 50 provided along the periphery of the exposure surface 26a.

Formation of the rib 50 provides an effect of increasing the overall surface area of the radiator body 26 and eventually improving the heat radiation efficiency. Another effect resides in that, by bringing the rib 50 into contact with the inner bottom surface of the box mold when integrally molding the insulating cover member 31 within the box mold, it becomes possible to reliably prevent the insulating material from flowing toward the rear exposure surface 26a of the radiator body 26.

Although the insulating material is prevented from flowing toward the rear exposure surface 26a by forming the rib 50 in the present embodiment, other means such as a jig or the like may be used for that purpose.

While the invention has been shown and described with respect to the embodiments, it will be understood by those skilled in the art that various changes and modification may be made without departing from the scope of the invention as defined in the following claims.

What is claimed is:

1. An electric power tool, comprising:
a motor;
a speed reduction mechanism for transferring the power of the motor;
a power output unit driven by the power transferred through the speed reduction mechanism;
a control circuit unit for controlling rotation of the motor; and
a housing for accommodating the motor, the speed reduction mechanism, the power output unit and the control circuit unit, the housing provided with an air supply-exhaust hole,
wherein the motor includes a stator core wound with coils; a rotor core provided with a magnet; an electronic circuit unit connected to the coils and the control circuit unit, the electronic circuit unit comprising a circuit board, electronic components arranged in the circuit board and including a switching element for turning on or off the electric power supplied to the coils, coil connection portions arranged in the circuit board and connected to the coils and a control circuit connection portion arranged in the circuit board and connected to the control circuit unit; a radiator member for dissipating heat generated in the switching element of the electronic circuit unit; and an insulating cover member molded with the electronic components, the coil connection portions, the control circuit connection portion, the circuit board and the radiator member,
wherein the electronic components, the coil connection portions, the control circuit connection portion and the circuit board are all covered with the insulating cover member against exposure.

2. The electric power tool of claim 1, wherein the insulating cover member is molded in such a way as to partially expose the radiator member.

3. The electric power tool of claim 2, wherein the radiator member includes an exposure surface and a rib provided along at least a portion of the periphery of the exposure surface.

4. The electric power tool of claim 1, wherein an opening is formed to extend through the circuit board of the electronic circuit unit, the radiator member and the insulating cover member, and a rotor shaft of the rotor core is extended through the opening.

5. The electric power tool of claim 1, wherein the insulating cover member is provided to form a ventilation window between an end surface thereof and the stator core.

6. The electric power tool of claim 1, wherein the radiator member makes contact with the switching element through a heat conduction sheet.

* * * * *